United States Patent [19]
Yocum

[11] 3,904,528
[45] Sept. 9, 1975

[54] PICK-UP ELEMENT FOR OILY CONTAMINANTS

[76] Inventor: Charles H. Yocum, 463 Adamsville Rd., Westport, Mass. 02790

[22] Filed: June 29, 1973

[21] Appl. No.: 374,886

[52] U.S. Cl. ............. 210/242; 210/40; 210/DIG. 21
[51] Int. Cl. .............................................. C02b 9/02
[58] Field of Search ......... 210/23, 36, 40, 242, 315, 210/496, DIG. 21

[56] References Cited
UNITED STATES PATENTS

| | | | |
|---|---|---|---|
| 2,770,241 | 11/1956 | Winkler | 210/496 X |
| 2,872,043 | 2/1959 | Fitzgerald et al. | 210/315 X |
| 3,518,183 | 6/1970 | Evans | 210/40 |
| 3,598,729 | 8/1971 | Baumann | 210/DIG. 21 |
| 3,617,566 | 11/1971 | Oshima et al. | 210/40 |
| 3,674,683 | 7/1972 | Rainer | 210/40 |
| 3,679,058 | 7/1972 | Smith | 210/242 |

Primary Examiner—John Adee
Assistant Examiner—Robert G. Mukai
Attorney, Agent, or Firm—Wenderoth, Lind & Ponack

[57] ABSTRACT

An element for picking up oily contaminant in liquid form from the surface of a body of water. The element has an outer container of porous material which is pervious to oily contaminants in liquid form and impervious to water. An absorber is positioned in said container and substantially fills it. The absorber is a spongy material which will absorb oily contaminant and has large spaced parallel surfaces and a plurality of slits therethrough in the direction of the thickness of the absorber. The slits define a plurality of wide flat strips which lie against each other. The slits extend from one end of the absorber to just short of the other end. Granules of absorbent material are sprinkled over the surfaces of the absorber.

8 Claims, 3 Drawing Figures

PATENTED SEP 9 1975          3,904,528

3,904,528

PICK-UP ELEMENT FOR OILY CONTAMINANTS

This invention relates to an element for picking up oily contaminants from a body of water, such as a harbor or lake, and more particularly relates to such an element which is relatively small and inexpensive and which can be used by individuals for cleaning up small oil spills and the like.

BACKGROUND AND PRIOR ART

The problems involved in cleaning up the oil spilled from tankers and the like have been in existence for many years, but with increasing amounts of oil being transported by water, with the consequent increase in frequency of oil spills, along with the increased concern for the ecology of the ocean and the seashores, the problem has become more acute. Added to the problems created by the use of oil tankers are the problems created by offshore drilling for oil, with its spills, leakage and blowouts.

The art has heretofore been principally concerned with these types of ecological accidents, which usually involve large quantities of oil or related contaminants, and the devices and systems for cleaning up the oil which escapes into the water and onto the surface of the water from these sources are usually rather large and cumbersome because of the large quantities of oil and the like which they must handle. The systems usually involve large booms which are floated on the surface of the water around the spilled contaminant, and which often not only contain the contaminant, but also include means for picking it up off the surface of the water and transporting it to some collection point.

Increasingly stricter standards for water purity in the waterways used by boat traffic have made it necessary to devise means for cleaning up smaller ecological accidents, such as spills of small amounts of oil, or accidental dumping of oil-like contaminants into the waterway from contiguous shores. It is impractical to use prior art devices on spills of, say, 25 or 50 gallons, since they are so large and in most instances require special equipment to position on and retrieve from the water. Moreover, it is prohibitively expensive for everyone who is in a position in which he might be responsive for a small spill to have readily available a large boom device, or to engage someone who has such a device for cleaning up the small spill.

OBJECTS AND BRIEF DESCRIPTION OF THE INVENTION

It is therefore an object of the present invention to provide an element for picking up oily contaminants from water, which element is small and easily handled by individuals and can be used for small spills.

It is a further object of the invention to provide such an element which is light in weight and which nevertheless has a large capacity for contaminant.

It is a still further object of the invention to provide such an element which is relatively inexpensive and from which the contaminant can be recovered, and which can be reused.

These objects are achieved by an element according to the present invention which has a pervious outer container which will pass oily contaminants in liquid form but not water. Within the outer container is a porous absorber, such as spongy material, which is generally flat and preferably in the shape of a regular polygon, such as a rectangle, having large spaced parallel surfaces, and which has substantial thickness relative to the thickness of the material of the outer container. The size of the absorber is sufficient to substantially fill the container. The absorber has a plurality of slits therethrough in the direction of the thickness thereof, and which extend from one end edge of the absorber to a point just short of the other end edge thereof. The absorber is thus in the form of a plurality of wide flat strips of porous material which are positioned on edge and flat against each other and joined to each other at one end of the absorber. Absorbent material is sprinkled at random over the surfaces of the absorber, both on the surfaces which are exposed and the surfaces of the strips which are against each other.

BRIEF DESCRIPTION OF THE DRAWINGS

The invention will now be explained in greater detail in the following specification, taken with the accompanying drawing, in which.

DETAILED DESCRIPTION OF THE INVENTION

Figure 1:
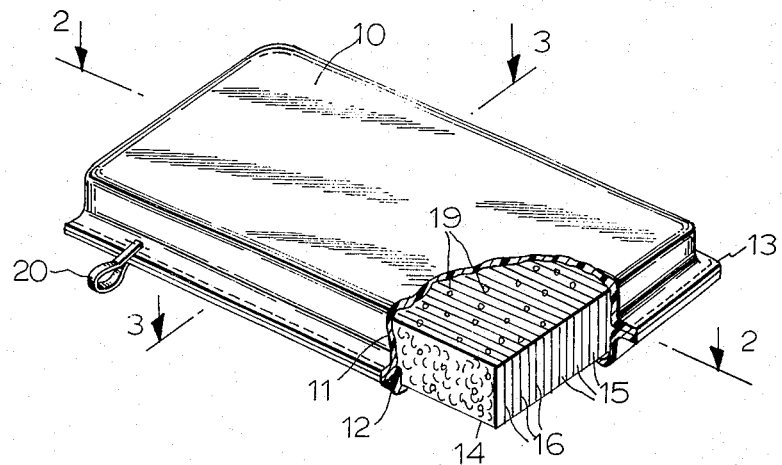
FIG. 1 is a perspective view, partly broken away, of the element according to the invention.
Figure 2:
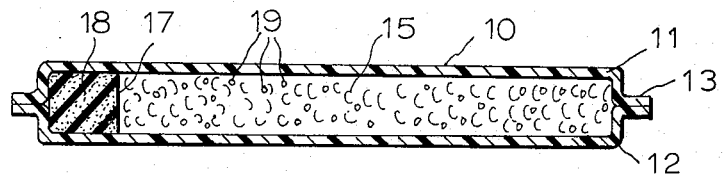
FIG. 2 is a sectional view taken on line 2—2 of FIG. 1.
Figure 3:
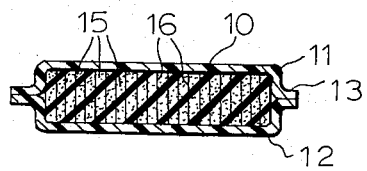
FIG. 3 is a sectional view taken on line 3—3 of FIG. 1.

The pick-up element according to the present invention comprises an outer container 10 which is water impervious and which is pervious to oily contaminants in liquid form. In the preferred embodiment it is composed of two flat sheets 11 and 12 of the oily contaminant pervious material joined together around the outside edges thereof. In the drawing, the sheets 11 and 12 are rectangular and hence the container is rectangular. In order to keep water out of the interior of the container, the edges of the sheets 11 and 12 must be sealed to each other in water tight fashion. One method of doing this will be described in connection with specific materials for the container. It is also preferred to secure the sheets together mechanically, such as by stitching 13, in order to increase the strength of the container.

Within the container is an absorber generally indicated at 14, which is composed of an absorbent material, here shown as a sponge material. The absorber 14 is generally flat and has the shape of a regular polygon, here a rectangle of the same proportions as the container 10 formed of the rectangular sheets, and has large spaced parallel surfaces and a substantial thickness relative to the thickness of the material of the sheets 11 and 12. As will be seen from the Figures, the size of the absorber 14 is sufficient to substantially fill the container 10. The absorber 14 has a plurality of slits 16 therethrough in the direction of the thickness thereof, and the slits 16 extend from one end edge of the absorber 14 to a point 17 just short of the other end edge of the absorber. The slits 16 thus define a plurality of wide flat strips 15 of porous material which are positioned on edge and flat against each other and which are joined to each other at 18 at one end of the absorber.

Absorbent material in the form of granules 19 is sprinkled at random over both the surfaces of the absorber which are exposed, such as the top and bottom surfaces, as well as the surfaces of the strips 15 which are placed against each other.

A number of materials in sheet form which are pervious to oily contaminants but not to water are known which are satisfactory for the container. In addition, the material should be resistant to deterioration by fresh and salt water to a degree that it will last from several months to several years in the water. One material which has been found to be very satisfactory is a multilayer sheet material formed of fiberglass in a polyethylene binder. Four layers of this material in a single sheet have been found to give satisfactory strength to the element of the invention. One advantage of this particular material is that it can be heat sealed, so that during the assembly of the element three sides of the upper and lower sheets 11 and 12 can be heat sealed as well as stitched to provide a seal against the ingress of water. In the preferred embodiment, the fourth side, after the absorber 14 and the absorber material have been placed inside the container, is folded double and stitched to form the seal therealong.

The material of the absorber 14 is preferably a sponge material, such as cellulose sponge which is resistant to deterioration by oil. Sponge material of other plastic material can also be used. The strips 15 are left attached to each other at one end for two reasons. First, the strips are kept oriented on edge and against each other in the absorber, and second the absorber 14 can be handled as a single element for insertion into the container 10.

The absorbent material is a material which absorbs contaminants such as oil and the like. For example, diatomaceous earth or calcined or baked absorbent clay can be used. Attapulgite clay is effective as an absorbent. The amount of the granulated material is relatively small in comparison to the overall size of the element. For example, for an element which is about one foot by two feet and about three inches thick, a handful of granulated absorbent is sufficient. The reason for this is that the primary means for absorbing the contaminant is the absorber 14. But because the absorber is normally dry when the element is first placed in the water in which the contaminant has been spilled, it does not absorb the contaminant very rapidly, just as a dry sponge does not absorb water very rapidly. It has been found that the granules of absorbent spread over the surfaces of the absorber increase the rate at which absorption of the contaminant takes place.

Attached to one of the longer edges of the element are a plurality of loops 20. In the embodiment shown in the figures, the loops are stitched to the abutting edges of the sheets 11 and 12, and there are preferably two loops (the second loop is not visible).

In use, the element is placed on the surface of the body of water on which the contaminant has been spilled, and because of its shape and because the absorber 14 is a sponge material, the element will float with one of the flat surfaces down. The contaminant, such as oil, will pass through the oily contaminant permeable material of the container 10, and will be absorbed in the absorber 14. The absorbent material 15 will increase the speed with which the sponge material of the absorber 14 takes up the contaminant. Because the strips 15 of the sponge material of the absorber are against each other and are oriented on edge with respect to the flat surface of the element, and hence with respect to the surface of the water on which the element is floating, capillary action will carry contaminant up between the strips 15 to speed the absorption process. Contaminant which passes through the material of the container 10 will be thus absorbed and retained in the absorber 14 until the absorber is saturated. It has been found that the element in which cellulose sponge is used will absorb up to about 15 to 20 times its weight in oil.

A further feature of the invention is attributable to the presence of the strips 15 of the absorber. When the element rests on the surface of moving water, the movement of the element on the water tends to flex the strips slightly, causing a slight squeezing action on the sponge material, which in turn further increases the speed of absorption.

The element will absorb oily contaminants which are liquid at the temperature of the water on which they have been spilled, such as crude and refined oil up to No. 4, lubricating oil of 10, 20, 30 and 40 weight, oils from organic materials, such as cottonseed oil, soybean oil, oil from chocolate, and the like, and oily solvents such as toluene.

The loops 20 can be used to string the elements together to form a small boom. All that it necessary is to pass a light line through the loops. Since they are on the longitudinal edge of the element, the element will still float in the water with a flat surface down, so that the absorbing action will proceed as described above.

The element can be made in a wide variety of sizes, although it is preferred that the size be such that one man can handle the element both in placing it on the surface of the body of water on which a spill has occurred, as well as remove it therefrom when it has taken up its full capacity of contaminant. It is also clear that it can be made in shapes other than rectangular as shown in the drawing. Any polygonal shape can be used, as well as round and oval shapes, as long as the element has two large flat surfaces so that it will float in the water with the strips on edge. It can also be sealed by other means, such as a sealant, a waterproof adhesive or the like, and can be mechanically secured by other means such as staples or rivets.

It will also be clear that the container can be made in ways other than by securing two sheets together. It can be made in several parts and conform closely in shape to the outer surfaces of the absorber. However, simply sewing and sealing two flat sheets together is of course the simplest and most economical way of making the container.

The oily contaminant can be recovered from the element and the element can be reused, although it is not as efficient in picking up contaminants after the first use. After it has been used, it is simply squeezed to squeeze as much of the contaminant out of the absorber as possible. The contaminant will flow out of the container 10 through the material of the container which is pervious to flow of oily contaminant in both directions.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What is claimed is:

1. An element for picking up oily contaminant in liquid form from the surface of a body of water, comprising an outer container of porous material which is pervious to oily contaminants in liquid form and impervious to water, an absorber in said container and substantially filling said container, said absorber being a spongy material which will absorb oily contaminant and having large spaced parallel surfaces and a plurality of slits therethrough in the direction of the thickness thereof defining a plurality of wide flat strips, said slits extending from one end edge of said absorber to just short of the other end edge, and granules of absorbent material sprinkled over the surfaces of said absorber.

2. An element as claimed in claim 1 in which said container is comprised of two flat sheets having the edges sealed together in water tight fashion.

3. An element as claimed in claim 2 in which the edges of said sheets are further mechanically secured to each other.

4. An element as claimed in claim 3 in which said sheets are stitched to each other.

5. An element as claimed in claim 1 in which said container is rectangular and is comprised of two rectangular sheets of a material which is heat sealable, said sheets being heat sealed to each other around three edges and stitched along said three edges, and the fourth edges are folded over and stitched.

6. An element as claimed in claim 1 in which said absorber is a polygonal shape having spaced flat surfaces.

7. An element as claimed in claim 6 in which said absorber is rectangular, and said slits extend in the long direction thereof.

8. An element as claimed in claim 1 in which said granular absorbent material is on the exposed surfaces of said absorber and on the surfaces of said strips which are opposed to each other.

* * * * *